United States Patent [19]

Block

[11] 4,309,946
[45] Jan. 12, 1982

[54] LASER PROXIMITY FUZING DEVICE
[75] Inventor: Kenneth A. Block, Claremont, Calif.
[73] Assignee: General Dynamics, Pomona Division, Pomona, Calif.
[21] Appl. No.: 653,249
[22] Filed: Jul. 13, 1967
[51] Int. Cl.³ .............................................. F42C 13/02
[52] U.S. Cl. .................................................... 102/213
[58] Field of Search .................... 102/70.2, 70.2 P, 213
[56] References Cited
U.S. PATENT DOCUMENTS 2,974,598 3/1961 McLean ............................. 102/70.2
3,228,337 1/1966 Grantham et al. ................. 102/70.2
3,239,674 3/1966 Aroyan ............................ 102/70.2 P
3,242,339 3/1966 Lee ................................. 102/70.2 P
3,369,488 2/1968 Sherwood et al. ................. 102/70.2

FOREIGN PATENT DOCUMENTS 1134202 11/1956 France ................................ 102/70.2
1201401 7/1959 France ............................ 102/70.2 P Primary Examiner—Charles T. Jordan
Attorney, Agent, or Firm—Lafayette E. Carnahan; Edward B. Johnson

[57] ABSTRACT

Broadly, the disclosure is directed to a range-measuring detonating system comprising an air-driven scanning mirror which cooperates with fixed mirrors to project the output of a laser toward a target, the laser being modulated at a given frequency by a local oscillator and modulator circuit. Adjacent the laser is a detecting means which feeds a receiver, the receiver output being in turn delivered to a detector which feeds a phase comparator to which is also applied the output of the local oscillator. The phase comparator output is coupled to an AND circuit to which is also applied the output of the detector. When the light energy returned by a target in the vicinity of the system achieves a given phase and amplitude, the phase comparator output is gated through the AND circuit to ignite a squib, booster and warhead.

2 Claims, 2 Drawing Figures

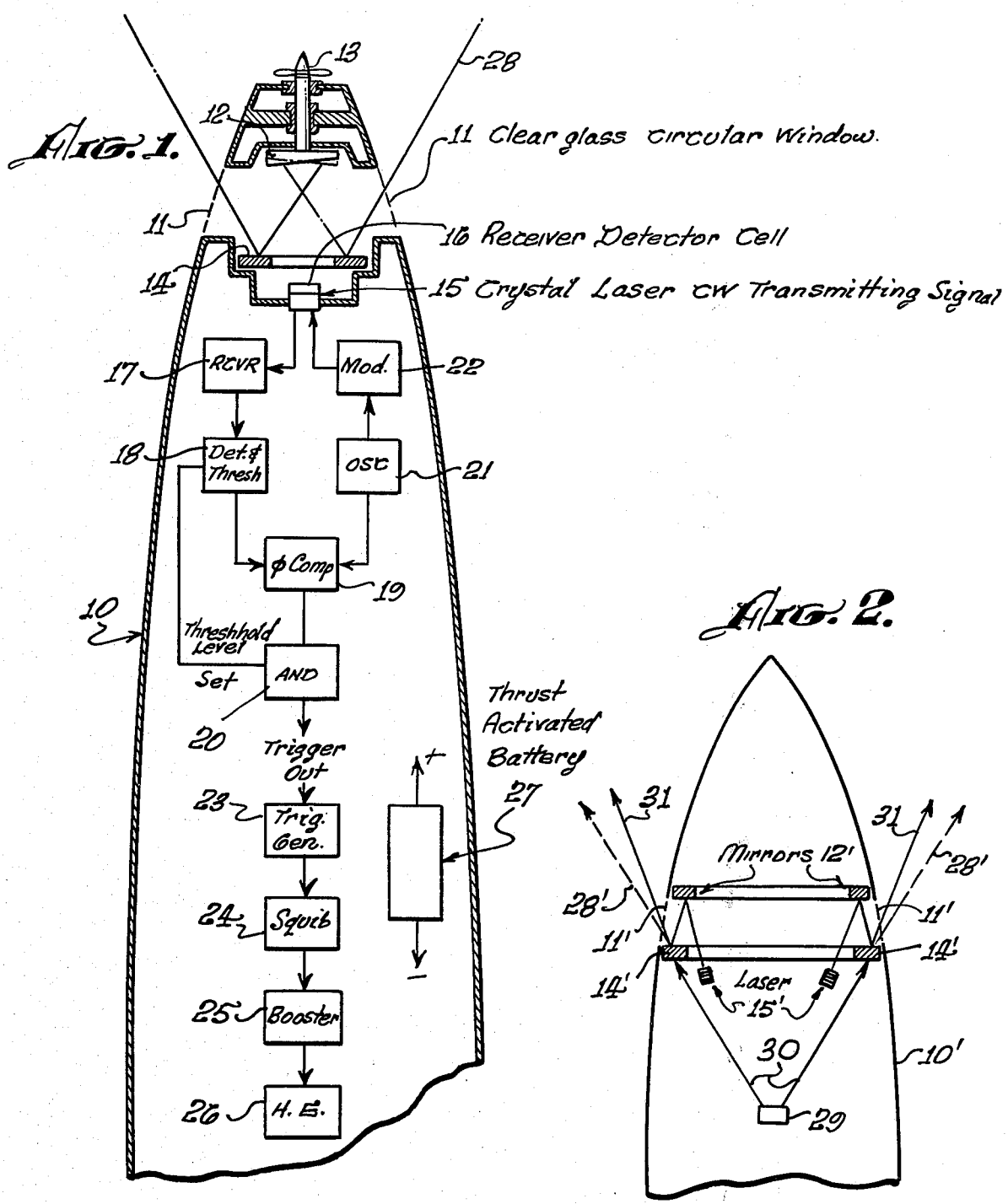

LASER PROXIMITY FUZING DEVICE

BACKGROUND OF THE INVENTION

This invention is related to light energy responsive systems for activating fuzes, and more particularly to a system for detecting the presence of a target or object and then determine the distance to the object followed by initiation of alarm or fuze activation when the object is at a prescribed distance from the system.

Systems which utilize light energy responsive detecting means to initiate fuzing upon the reception of sufficient target signal strength are known in the art as evidenced by U.S. Pat. Nos. 2,882,823; 2,892,093; and 3,034,436. However, such a system which utilizes an air-driven scanning mirror which cooperates with fixed mirrors to project the output of a laser toward a target, the laster being modulated at a given frequency by a local oscillator and modulator circuit, the scanning and fixed mirrors additionally functioning to receive reflected light and direct same to a detecting means, the output of which is utilized via a phase comparator arrangement to activate the warhead fuze of a projectile, bomb, rocket, missile, or other such device is not known in the prior art.

SUMMARY OF THE INVENTION

Therefore, it is an object of this invention to provide a proximity fuzing device.

A further object of the invention is to provide a system for detecting the presence of an object and then determining the distance to the object followed by initiation of alarm or fuse activation when the object is at a prescribed distance from the device.

Another object of the invention is to provide a system which utilizes light energy responsive detecting means to initiate fuzing upon the reception of sufficient target signal strength.

Another object of the invention is to provide a laser proximity fuzing device which includes a mirror assembly and an electronics assembly for transmitting the laser beam and for receiving reflected light for activating the fuzing device.

BRIEF DESCRIPTION OF DRAWINGS

FIG. 1 diagrammatically illustrates an embodiment of the invention; and

FIG. 2 diagrammatically illustrates a portion of a modification of the FIG. 1 system.

DESCRIPTION OF THE INVENTION

The embodiment of the system illustrated to describe the invention is mounted in the forward end of a rolling missile generally indicated at 10. However, the system could be utilized in a non-spinning vehicle or in a very rapid spinning vehicle. Also, the system could be utilized in projectiles, bombs and rockets for activating a fuze therein. The forward portion of the missile 10 is provided with annular transparent window 11 which may be constructed of any suitable material. Mounted in the forward end of the missile 10 is a reflector or mirror 12 which is rotated by an air driven propellor assembly generally indicated at 13. Positioned aft of the window 11 is an annular reflector or mirror 14 having a central opening aft of which is mounted a crystal laser 15 transmitting a continuous wave signal. Cooperatively mounted with respect to laser 15 is a receiver detector assembly or cell 16, the output of which feeds a receiver unit 17, with the output from receiver 17 being directed to a detector and threshold assembly 18. The output from the assembly 18 is fed to a phase comparator 19 and to an AND circuit 20. The phase comparator 20 output is coupled to the AND circuit 20. The output of an oscillator 21, indicated in this embodiment as of the 30 mc type, is operatively connected to phase comparator 19 and the receiver detector 16 via a modulator assembly 22 which thus serves to amplitude modulate the signal being fed from oscillator 21 to detector 16. The output from the AND circuit 20 is fed through a trigger generator 23 which activates a squib 24 which in turn activates a booster assembly 25 which ignites a high explosive indicated at 26. A power source 27, which may be for example, a thrust activated battery is provided and operatively connected to the above described components as required and known in the art and thus not shown.

In operation, and with the missile 10 having been launched by suitable means, now shown, a continuous beam from laser 15 is directed outwardly via rotating reflector 12 and annular mirror 14. The rotation of the reflector 12 by air driven propeller 13 causes the laser beam to scan a conical angle. The reflectors 12 and 14 also direct the beam indicated at 28 which is reflected by the target to the receiver detector unit 16 which is fed via receiver 17 and assembly 18 to the phase comparator 19 and the AND circuit 20. When the amplitude and phase of modulation from oscillator 21 on the return or reflected signal are acceptable the AND circuit is actuated, as known in the art, and the output thereof activates the trigger generator 23 which causes the ingition of squib 24, booster 25 and the high explosive 26.

While the embodiment described above utilizes 30 mc as the modulation frequency, a simpler device could be achieved by using an audio frequency in the range of 3000 cps to transmit and receive the intelligence.

The embodiment of the invention illustrated in FIG. 2 is generally similar to the FIG. 1 embodiment except that it utilizes a plurality of certain of the system components described with respect to FIG. 1, and thus provides a capability for variable angle fuzing. The advantage of variable angle fuzing improves the effectiveness of the fuze action against large or small targets (aircraft) as well as to compensate for aspect and approach angle.

Only that portion of the FIG. 2 system which differs from that described in FIG. 1 is illustrated and described, but it is understood that the various electrical and fuzing components 16–27 operatively connected with the FIG. 1 embodiment laser 15 are utilized for each of the laser assemblies shown. While the FIG. 2 embodiment illustrates a two laser-optics assembly, any desired number located symmetrically about the missile body may be utilized.

As shown in FIG. 2, the forward end of a rolling missile 10' is provided with an annular or a plurality of separate transparent windows generally indicated at 11'. Mounted in the forward end of the missile 10' is a pair of reflectors or mirrors 12'. Positioned aft of the window 11' are a pair of individual reflectors or mirrors 14'. Aft of the mirrors 14' are a pair of crystal laser units 15' transmitting a continuous wave signal. Each of the mirrors 14' are adapted to be moved by any conventionally known electromechanical mechanism generally indicated at 29 via drive chain 30 which mechanically sets the angle of mirrors 14' just prior to firing the fuzing mechanism which changes the look angle of the laser radiation beam from the dashed line 28' to the solid line beam indicated at 31. Thus, the FIG. 2 system improves the effectiveness of the fuze action against large or small targets as well as to compensate for aspect or approach angle. Note that the FIG. 2 installation embodies about one-half of the optics per laser unit compared to that utilized in FIG. 1.

An advantage of the illustrated system is the security of its operation since the radiation is not in the normal wavelengths of radar or infrared. The device employs a continuous wave emission that is modulated with a radio frequency which is the intelligence carrier. This information is used to determine the presence and range of the detected object.

The instant invention utilizes a constant wavelength crystal laser although the laser could be pulsed as in radar sets, and uses modulation to obtain positive and correct presence and range of an object.

While the device has been illustrated and described for use in a missile or the like, it may be used as a motion or signal interruption detector by removing the rotating mirror, may be positioned in a stationary application, and the air unbalance or change in the threshold and/or phase of the return signal will indicate the motion of the reflecting object. Also, for applications in vehicles that spin very rapidly, the rotating mirror may be eliminated and a single window may be used.

It has thus been shown that the present invention provides a system to detect the presence of a target or object and then determine the distance to the object followed by initiation of alarm or fuze activation when the object is at a prescribed distance from the device containing the system.

What I claim is:

1. A range-measuring and detonating system comprising: a rolling type air vehicle having a transparent section in the forward portion thereof; air driven propeller means operably mounted in the forward end of said air vehicle for rotation about an axis; a first reflector means operatively mounted in said air vehicle forward of said transparent section and connected to the aft end of said propeller means for rotation with said propeller means about said axis; a second reflector means having a central opening therein operatively mounted in said air vehicle both aft of said transparent section and aft of said first reflector means for directing reflections to said first reflector means and for passing reflections from said first reflector means through said central opening; laser means operably mounted in said air vehicle aft of said second reflector means for directing a beam through said central opening of said second reflector means toward said first reflector means for reflection by said first reflector means; detecting means mounted adjacent said laser means for intercepting and detecting reflections received from said first reflector means through said central opening of said second reflector means and for producing an output signal; receiver means operably connected to said detecting means to receive the output signal from said detecting means and to produce another output signal; detector and threshold assembly means operably connected to said receiver means to receive the output signal from said receiver means and to produce a further output signal; an oscillator mounted in said air vehicle; modulator means operably connected to said detecting means and to said oscillator, said modulator means being responsive to said oscillator; a phase comparator responsive to said oscillator and to the output signal from said detector and threshold assembly means; an AND circuit operatively connected to receive the output from said phase comparator and from said detector and threshold assembly; a trigger generator operably connected to said AND circuit and responsive thereto; a squib operably connected to said trigger generator and responsive thereto; a booster assembly operably connected to said squib and responsive thereto; and an explosive charge operably connected to said booster assembly and responsive thereto, whereby said explosive charge is ignited and detonated.

2. The system defined in claim 1, wherein said laser means is a continuous wave type crystal laser assembly.

* * * * *